United States Patent
Burke et al.

(10) Patent No.: US 6,332,709 B1
(45) Date of Patent: Dec. 25, 2001

(54) CONTACT TEMPERATURE PROBE WITH THERMAL ISOLATION

(75) Inventors: John W. Burke, McLean, VA (US); Andre B. Cardoso, Braga (PT); Joseph G. McGinnity, Gaithersburg, MD (US)

(73) Assignee: Axcelis Technologies, Inc., Beverly, MA (US)

( * ) Notice: Subject to any disclaimer, the term of this patent is extended or adjusted under 35 U.S.C. 154(b) by 0 days.

(21) Appl. No.: 09/495,704

(22) Filed: Feb. 1, 2000

Related U.S. Application Data

(60) Provisional application No. 60/118,175, filed on Feb. 1, 1999.

(51) Int. Cl.[7] ............... G01K 1/12; G01K 1/14; G01K 1/18; G01K 7/04
(52) U.S. Cl. ............... 374/179; 374/165; 374/208; 136/221; 136/233
(58) Field of Search ................... 374/179, 165, 374/208, 163, 185, 183; 136/221, 233, 232, 230

(56) References Cited

U.S. PATENT DOCUMENTS

| | | | |
|---|---|---|---|
| 3,819,420 | * | 6/1974 | Schmidt et al. ............... 136/230 |
| 4,859,081 | * | 8/1989 | Kabayashi ............... 374/179 |
| 4,871,263 | * | 10/1989 | Wilson ............... 136/232 |
| 5,193,912 | * | 3/1993 | Saunders ............... 374/179 |
| 5,321,719 | * | 6/1994 | Reed et al. ............... 374/208 |
| 5,356,486 | * | 10/1994 | Sugarman et al. ............... 374/179 |
| 5,370,459 | * | 12/1994 | Culbertson et al. ............... 374/179 |
| 5,527,111 | | 6/1996 | Lysen et al. ............... 374/208 |
| 5,791,782 | | 8/1998 | Wooten et al. ............... 374/208 |
| 6,040,518 | * | 3/2000 | Kinnard ............... 374/179 |
| 6,113,263 | * | 9/2000 | Satoh ............... 374/179 |
| 6,257,758 | * | 7/2001 | Culbertson ............... 374/179 |

FOREIGN PATENT DOCUMENTS

| | | |
|---|---|---|
| 42 44 189 A1 | 12/1992 | (DE) . |
| 1026489 A1 * | 1/2000 | (EP) . |
| 04309825 A * | 11/1992 | (JP) . |
| 05033144 A1 * | 2/1993 | (JP) . |

* cited by examiner

*Primary Examiner*—Diego Gutierrez
*Assistant Examiner*—Stanley J. Pruchnic, Jr.

(57) ABSTRACT

A contact temperature probe having a probe head which includes a temperature sensor having lead wires which exit the head and run through a shield for shielding the wires from the process, wherein the probe head is supported for pivoting motion only by the lead wires and the shield is thermally isolated from the probe head.

9 Claims, 4 Drawing Sheets

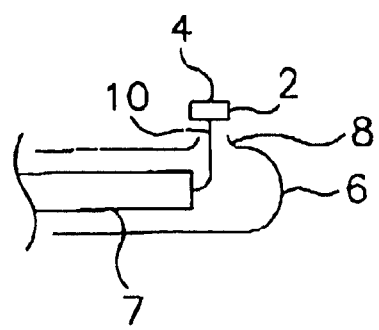 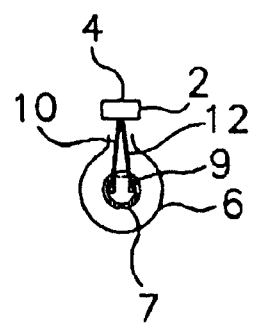
FIG. 1          FIG. 2
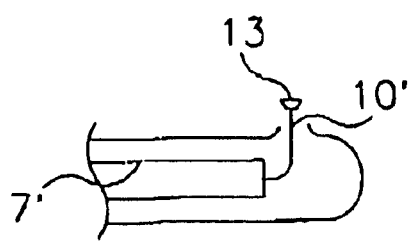 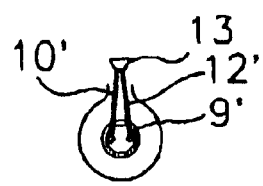
FIG. 3A         FIG. 3B
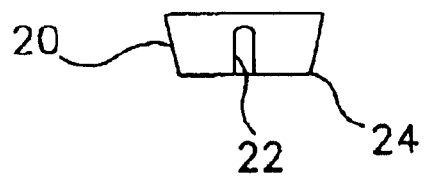
FIG. 4

CONTACT TEMPERATURE PROBE WITH THERMAL ISOLATION

The present application is based on Provisional Application No. 60/118,175, filed Feb. 1, 1999.

BACKGROUND OF THE INVENTION

The present invention is directed to an improved contact temperature probe for measuring the temperature of a semiconductor wafer being processed, and particularly to a temperature probe which provides more accurate temperature readings.

In U.S. Pat. No. 5,791,782, a contact temperature probe is disclosed having a probe head which pivots under the weight of a semiconductor wafer, so as to maintain close contact therewith. In FIG. 12 of such patent, an embodiment is disclosed wherein the probe head is set on and pivots on the lip of a quartz shield through which the temperature sensor lead wires are run to protect the wires from the process environment.

While the concept of a pivoting probe head results in reduced contact resistance between the wafer and the probe head, it has been found that for some applications the temperature measurements which are afforded by the prior art probe are not as accurate as is desired.

SUMMARY OF THE INVENTION

It is thus one object of the invention to provide a contact temperature probe which provides more accurate measurements.

In accordance with the invention, the above as well as other objects are obtained by providing a contact temperature probe having a probe head having a flat contact surface for contacting the semiconductor wafer and including a temperature sensor having lead wires which exit the body and run through a shield for shielding the wires from the process environment, wherein the probe head is supported only by the temperature sensor lead wires and the shield does not touch the probe head.

BRIEF DESCRIPTION OF THE DRAWINGS

The invention will be better appreciated by referring to the accompanying drawings wherein, FIG. 1 is a side view of an embodiment of the invention.

FIG. 2 is an approximately vertical sectional view taken through V lead wires of FIG. 1.

FIGS. 3A and 3B show a further embodiment of the invention.

FIG. 4 shows a probe head.

DETAILED DESCRIPTION OF THE INVENTION

Figure 6:
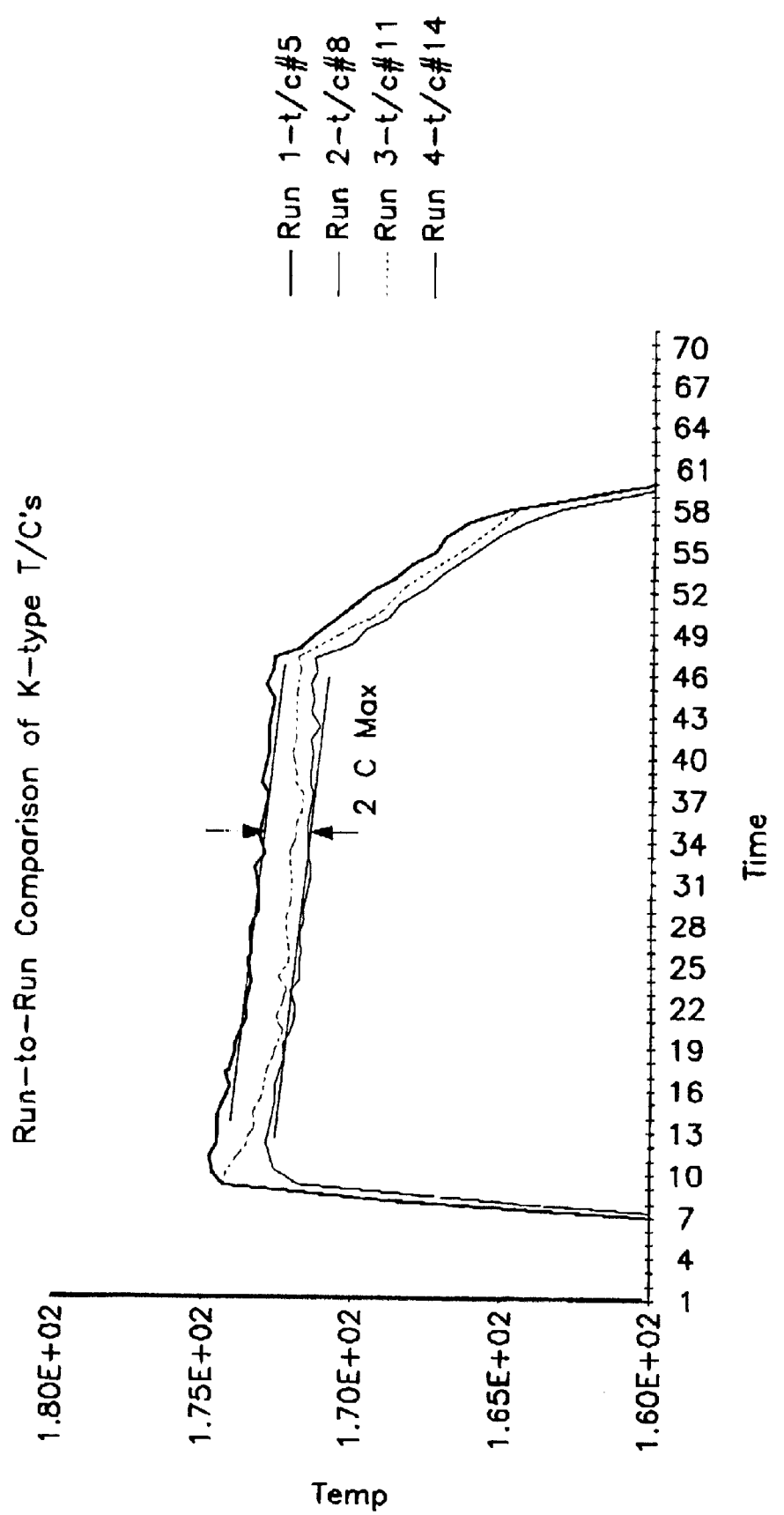
FIG. 6 is a graph showing temperature sensor consistency of measurement for an embodiment of the present invention.

Referring to FIG. 1, a side view of an embodiment of the invention is depicted, and is seen to be comprised of probe head 2 having flat contact surface 4 for contacting a semiconductor wafer, and quartz shield 6 for shielding the temperature sensor wires from the process environment. In the process chamber, the wafer may be supported on three supports, for example, two glass pegs and the device shown in FIG. 1. Such an arrangement is shown in FIG. 6 of the above-mentioned U.S. Pat. No. 5,791,782 the entire contents of which are herein incorporated by reference.

In the arrangement of the prior patent, the probe head sets on lip 8 of quartz shield 6 herein and pivots thereon under the weight of the semiconductor wafer. However, as mentioned above, the accuracy of the temperature measurement provided by this device is not good enough for some applications.

In accordance with the present invention, the probe head is supported only by the temperature sensor wires 10 and 12, and is thermally isolated from the quartz shield. The thermal isolation reduces the effective thermal mass, and causes the temperature sensor to more closely follow the temperature of the wafer.

At the same time, the pivoting motion of the probe head under the weight of the wafer is retained, as will be explained below.

In the preferred embodiment, the temperature sensor is a thermocouple. As known to those skilled in the art, such a device is formed by creating a bead from two metallic wires of predetermined properties. Referring to FIG. 4, a probe head 20 is shown having a centered, axial, blind hole 22 extending from the lower surface 24. The thermocouple bead is inserted in this hole. The hole is then collapsed by a crimping operation around the thermocouple as described in detail in the above-mentioned U.S. Pat. No. 5,791,782. This creates good electrical contact between the two wires at the bead and good thermal contact between the probe head and the thermocouple.

Referring again to the embodiment of FIGS. 1 and 2, it is seen that sensor wires 10 and 12 form two legs of a triangle having an apex at the head. The wires are of suitable stiffness to support the probe head by themselves while allowing pivoting of the head around the bead under the weight of the wafer. Thus, isolation of the probe head from the quartz shield is achieved while the pivoting action of the probe head on its support is retained, so as to ensure intimate contact between the probe head and the wafer and correspondingly low contact resistance. Additionally, a device which is mechanically more robust than that of the prior art is provided.

While the embodiment of FIGS. 1 and 2 depicts the lead wires as two legs of a triangle, other support configurations may be used. For example, the wires may both be vertically oriented, or may be bent in various ways. The probe head may be made of aluminum or other thermally conductive, reflective, non-corrosive material.

The quartz shield 6 encloses a stainless steel tube 7 which protects the thermocouple wires from extraneous electrical signals. Within the stainless steel tube 7 is a ceramic tube 9 having two longitudinally extending openings through which the wires are run. The ceramic tube provides heat insulation for the thermocouple wires. the ceramic tube also prevents the two wires from touching each other creating an additional thermocouple junction resulting in inaccurate wafer temperature measurements.

The processing of semiconductor wafers sometimes includes exposing the wafer to ultraviolet or other radiation, which may be emitted by lamps. In the prior art, it was found that such radiation heated the thermocouple wires and resulted in inaccurate temperature readings. In accordance with an improvement of the present invention, the ceramic sheath is extended to cover the entire portion of the wire which runs in the longitudinal direction of the quartz shield, thus minimizing lamp heating of the wires.

Figure 7:
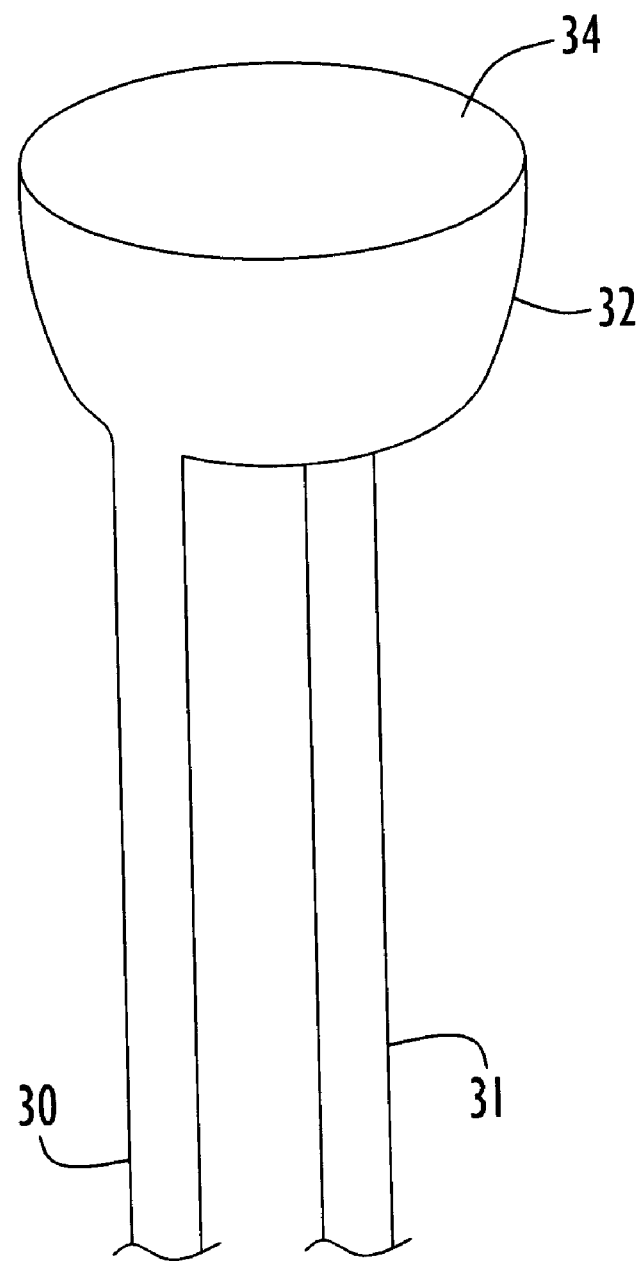
FIG. 7 shows a welded probe head.

FIG. 7 shows a further embodiment of a temperature probe in accordance with the invention. In this embodiment, the thermocouple junction is welded, and the weld itself forms the probe head. That is, a thermocouple junction is formed by intertwining two wires of dissimilar materials. In the FIG. 7 embodiment, the two wires 30 and 31 are encompassed by a weld 32, the top surface 34 of which is made flat and polished to produce the wafer contacting surface.

A first method of producing the device of FIG. 7 is to use .03" diameter thermocouple wire to form the junction, weld the junction, grind and polish the weld, and replace the lead wires with .005" diameter thermocouple wire by grinding off the original lead wires and re-welding the new lead wires.

A second method of producing the welded junction is to weld .005" wire at sufficient amperage to sustain an arc for puddling the molten junction into a polished, flat crucible. Nickel is an example of a weld material which may be used.

FIGS. 3A and 3B are side and end views respectively of an embodiment similar to FIGS. 1 and 2, but which uses a welded junction 13 similar to that depicted in FIG. 7. The other reference numerals used in FIGS. 3A and 3B correspond to those in FIGS. 1 and 2.

In accordance with a further feature of the invention, the probe head is made substantially smaller than in prior art, in that it is arranged to have a diameter of less than .1". While providing a suitable contact surface, this results in less thermal mass, with a consequently faster response time as well as less variation in response due to heating from external heat sources such as lamps which may be used in the processing. The combination of the thermal isolation provided by the improved structure and the decreased thermal mass results in more consistently repeatable measurements, which is illustrated in the graphs of FIGS. 5 and 6.

Figure 5:
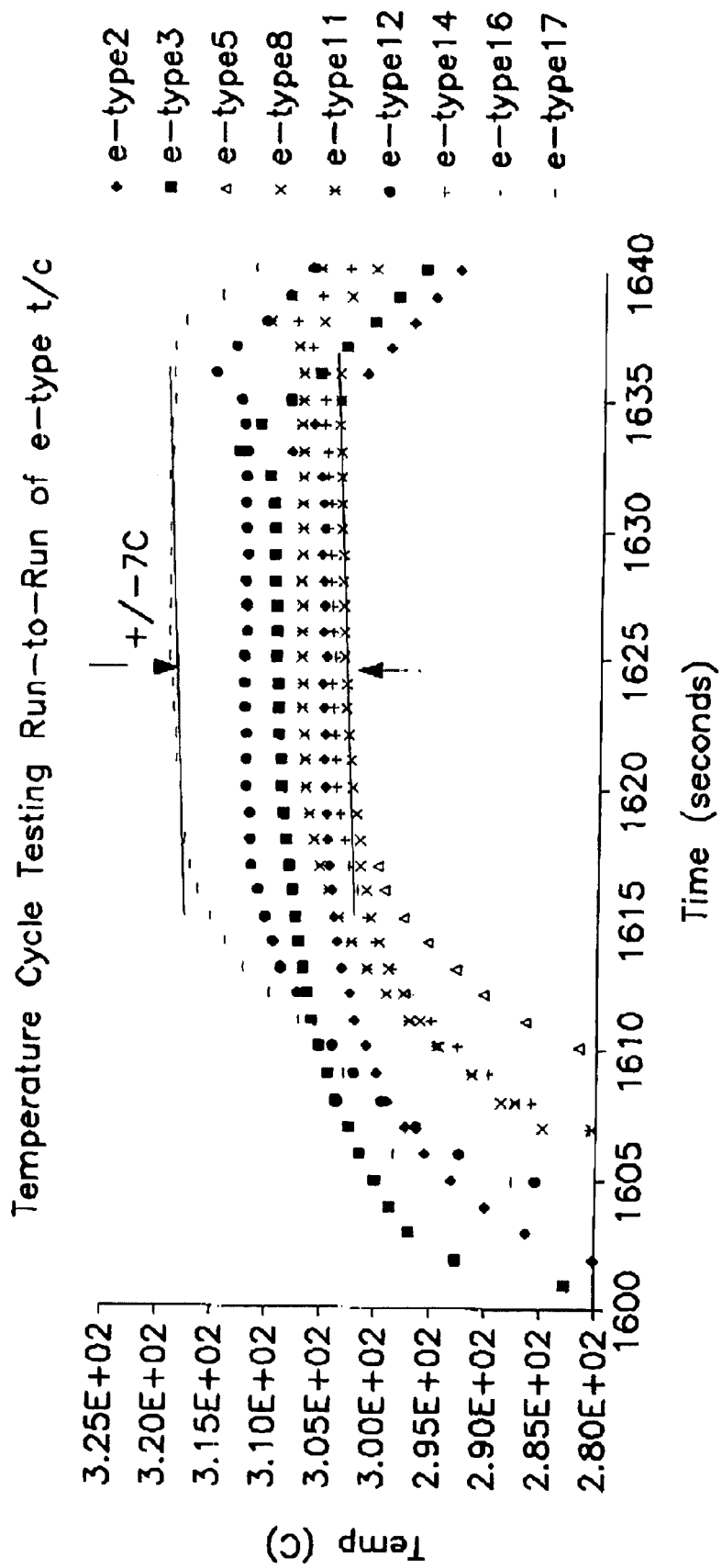
FIG. 5 is a graph showing temperature sensor consistency of measurement for a prior art device.

FIG. 5 is a graph depicting temperature response for different runs using different individual prior art probe heads of the type disclosed in U.S. Pat. No. 5,791,782. As can be seen, the consistency of the repeated measurements is within ±7° C.

FIG. 6 is a graph which depicts temperature response for different runs using different individual probe heads made according to the present invention. As can be seen, in the case of FIG. 6, the consistency of the repeated measurements is within ±2° C., which is a substantial improvement.

In the actual embodiment of the invention which produced the results shown in FIG. 6, the diameter of the probe head was .073", and the thermocouple wire was made of a nickel alloy such as chromel alumel, to be fluorine resistant. The thermocouple was a type K device.

Thus, an improved contact temperature probe has been disclosed. Variations will occur to those skilled in that which do not depart from the spirit of the invention and it should be understood that the subject matter to be covered is defined by the claims appended hereto.

What is claimed is:

1. A contact temperature probe for measuring the temperature of a semiconductor wafer in a process environment, comprising:
   a contact temperature probe head having a flat contact surface (4) for contacting the semiconductor wafer and including a temperature sensor having lead wires which exit the probe head and run through a shield (6) for shielding the wires from the process environment,
   wherein the probe head is supported only by the temperature sensor lead wires, and the shield does not touch the probe head.

2. The temperature probe of claim 1 wherein the lead wires are of such stiffness to support the probe head while allowing pivoting movement of the probe head under the weight of the semiconductor wafer.

3. The temperature probe of claim 2 wherein the probe head includes a probe body in which the temperature sensor is disposed.

4. The temperature probe of claim 3 wherein the probe head is formed by a weld around a thermocouple junction.

5. The temperature probe of claim 4 wherein the lead wires form two legs of a triangle, having an apex at the temperature sensor.

6. The temperature probe of claim 3 wherein the shield is longitudinally extending, and there is a longitudinally extending ceramic sheath in the shield, and a portion of the lead wires extend in the longitudinal direction of the sheath and pass through the sheath.

7. The temperature probe of claim 6 wherein the ceramic sheath encloses substantially the entire portion of the lead wires which extend in the longitudinal direction of the ceramic sheath.

8. The temperature probe of claim 3, wherein the diameter of the probe head is less than 0.1".

9. A contact temperature probe for measuring the temperature of a semiconductor wafer in a process environment, comprising:
   a contact temperature probe head including a flat contact surface for contacting the semiconductor wafer and a body which houses a thermocouple bead having lead wires which exit the body and run through a shield for shielding the wires from the process environment,
   wherein the probe head does not touch the shield and is supported only by the thermocouple lead wires, which are of a stiffness to support the probe head while allowing pivoting movement of the probe head under the weight of the semiconductor wafer.

\* \* \* \* \*